Figure 1A:
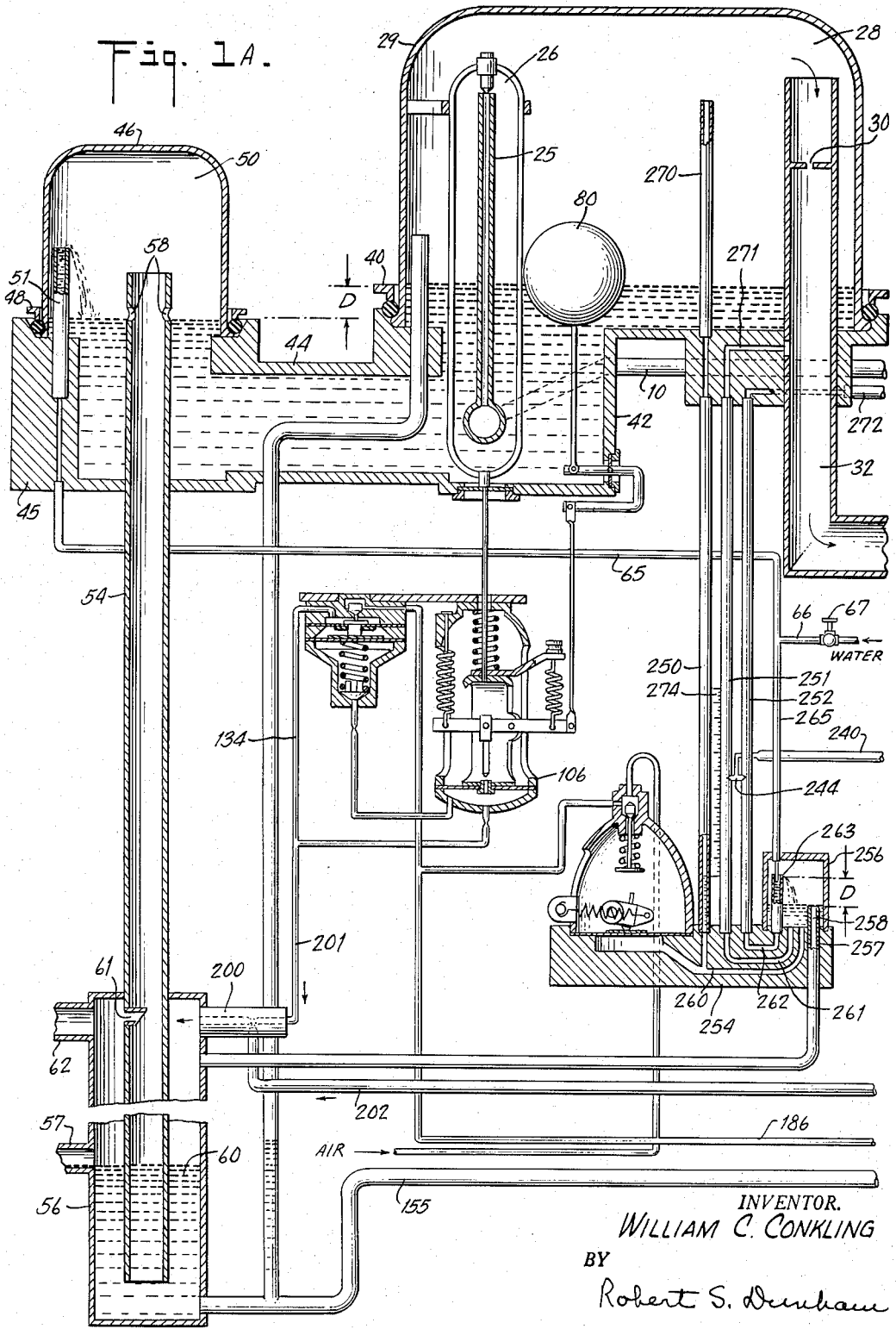

May 22, 1956  W. C. CONKLING  2,746,482
GAS CONTROLLING APPARATUS
Original Filed Feb. 1, 1949  2 Sheets-Sheet 1

INVENTOR.
WILLIAM C. CONKLING
BY
Robert S. Dunham
ATTORNEY

May 22, 1956     W. C. CONKLING     2,746,482
GAS CONTROLLING APPARATUS
Original Filed Feb. 1, 1949     2 Sheets-Sheet 2

INVENTOR.
WILLIAM C. CONKLING
BY
Robert S. Dunham
ATTORNEY

United States Patent Office 2,746,482
Patented May 22, 1956

2,746,482

GAS CONTROLLING APPARATUS

William C. Conkling, Lockport, N. Y., assignor to Wallace & Tiernan Incorporated, a corporation of Delaware Original application February 1, 1949, Serial No. 74,036. Divided and this application October 14, 1954, Serial No. 462,351

1 Claim. (Cl. 137—489)

This invention relates to apparatus for controlling the pressure or flow of gas flowing along a conduit, and is principally designed to provide new and improved apparatus of pressure controlled character, for controlling and indicating the flow of a gas, for example in feeding a reagent gas or the like from a source of supply to a point of use or application. In an important specific aspect the invention is concerned with equipment of the type wherein the conduit structure for gas flow includes a suitable resistance, e. g. an orifice, together with means for adjusting pressure conditions in the conduit so as to regulate the rate of gas flow by controlling and indicating the pressure drop across the resistance.

This application is a division of my copending application Serial No. 74,036, filed February 1, 1949, now Patent No. 2,715,417, granted August 16, 1955.

In prior apparatus of the sort last mentioned, it has been proposed to effect the control by maintaining an approximately constant pressure on one side of the fixed orifice, say the up-stream side, and then adjusting the pressure in the conduit on the down-stream side of such resistance, in order to vary the pressure drop across the latter and thus presumably change the rate of gas flow in accordance with the known relationship of flow to pressure drop. One important form of apparatus in which such structure has been utilized and to which the present invention is specially applicable has been designed for treating the contents of a water main or the like with a gas such as chlorine, e. g. for purification in water supply systems and sewage treatment systems. In the chlorine feeding apparatus, an effective arrangement has been to provide an aspirator in a minor stream of water leading to the main under treatment, the aspirator establishing a vacuum or "negative pressure" which draws the gas from the source through the fixed orifice (sometimes called a metering orifice), the flow-controlling pressure drop across the latter being adjusted by changing the pressure at its down-stream side. At the up-stream side, the gas is caused to traverse a chamber supplied with water to a level determined by the pressure, usually subatmospheric, therein; the gas inlet to the chamber is customarily adjusted by a float valve designed to provide approximate constancy of such pressure, i. e. on the up-stream side of the orifice. For indication of the rate of gas flow the apparatus commonly has manometers showing the pressures on both sides of the orifice, from which the flow rate is determinable.

While apparatus of the character stated has been in many respects highly perfected, some problems have remained or arisen, for example relating to the attainment of a higher order of accuracy in gas flow control, to rapidity and fidelity of response upon adjustment, to simplicity of flow indication, and to prevention of the escape of chlorine fumes around the apparatus, at least a number of these problems being particularly serious in devices required to handle a relatively high rate of gas flow, an example of such operation, in chlorination equipment, being the supply of chlorine at rates ranging upward of three pounds of gas per hour. Thus for instance on the down-stream side of the orifice, a variety of means have been used for adjusting the vacuum in the conduit, for instance involving a float-controlled throttling valve or the like, which has been adjusted by a pressure controlling instrumentality transmitting its changes of pressure through a hydraulic water leg that extends to the valve-operating float chamber. It is found, however, that friction loss in the water leg and the inertia of the liquid and float in the controlled chamber may tend to interfere somewhat with rapidity or accuracy of response in making adjustments of chlorine flow.

In consequence, an important object of the present invention is to provide improved apparatus of the character described, affording more accurate, rapid and reliable adjustment of gas flow, even in handling relatively large rates of gas feed.

Other objects are to provide new arrangements for gas flow control or regulation, sensitive to pressure changes, e. g. in the gas itself or in a source of controlling pressure.

An important object is to afford a novel and peculiarly effective structure for the adjustment of pressure in the conduit structure down-stream of the metering resistance, particularly to provide a device which responds practically immediately to change of the controlling instrumentality and in which the controlling instrumentality, as well as its transmission of adjustments to the controlled device, may be of a novel and simplified character, permitting ease of operation and ready adaptability to operation at a remote locality or by time-controlled or other automatic means.

To these and other ends, important features of the invention comprise, in an apparatus for controlling the pressure or flow of a gas flowing along a conduit, adjustable valve means for varying the pressure in the conduit in accordance with adjustment of said valve means, a pair of chambers of which one is disposed within the other and which are arranged in communication respectively with the conduit on one side of the valve and with another source or locality of controlling pressure, said chambers being arranged to contain liquid in each and to provide an enclosed space in each above the liquid to receive the communicated gaseous pressure, and said chambers communicating freely with each other through the liquid so that each is sealed from the other by said liquid, a preferred feature of the invention being that the space in the outer chamber communicates with the conduit up-stream of the valve means; and one of said chambers being movable relative to the other and being balanced in a rest position only when there is a predetermined relationship between the gaseous pressures in the chambers, and means controlled by the movable chamber and responsive to unbalance thereof occasioned by change in pressure of one of the chambers, for adjusting the aforesaid valve means to modify the pressure in the conduit until the aforesaid relationship of pressures in the chambers is restored.

Further features which the invention may embrace include the above arrangements wherein the above-mentioned source of controlling pressure is separate from the conduit and adjustable independently thereof, and also such arrangements wherein the valve adjusting means comprises powered means controlled by an element which is coupled to a means for movably holding the inner chamber, said last-mentioned means normally holding said inner chamber in the balanced condition.

Figure 1B:
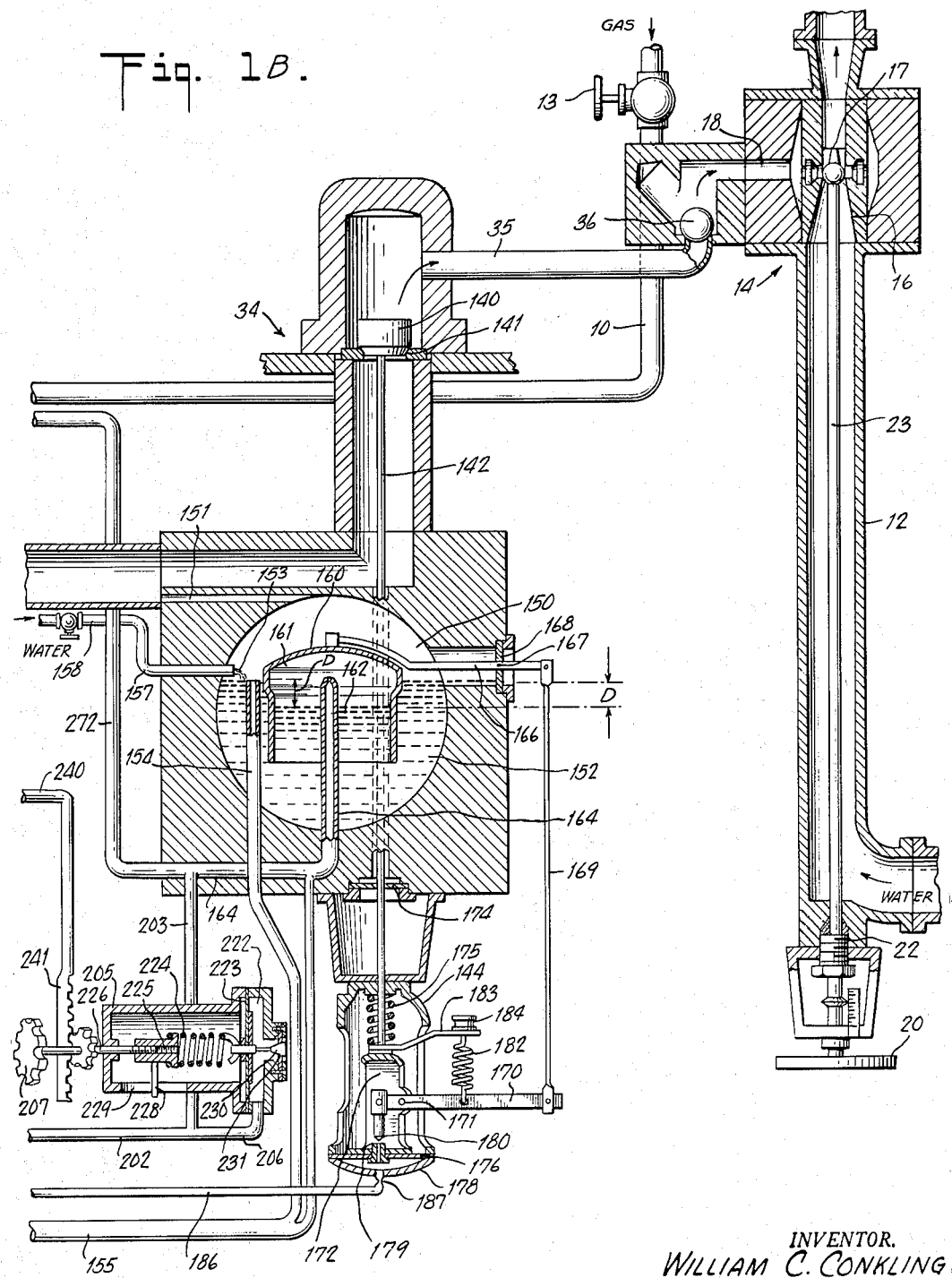

In the accompanying drawing Figs. 1A and 1B conjointly show a schematic view of a gas flow system embodying the invention, various elements of the system being in vertical section.

While the present improvements are applicable to various kinds of apparatus and for the control or feeding of other gases or gas under other pressure conditions above and below atmospheric, and while certain features and sub-combinations of the invention may be useful separately or in other relationships, the illustrated structure is, for purposes of example, designed to provide feed of chlorine gas, at a carefully regulated rate, adjustable over a wide range, for introduction of such gas into a flowing stream of aqueous liquid. Indeed, under such circumstances the invention is of special utility, for example as it avoids undesirable effects of such gas and particularly as it includes structure for prompt, accurate and reliable gas flow control within a range of subatmospheric or negative pressures found convenient in equipment for such purpose.

The apparatus shown is designed to receive gas, e. g. chlorine, through an inlet pipe 10 and to deliver the gas into a stream of water traversing a pipe 12. Entering the tube 10 through a valve 13, appropriate for shut-off or other purposes, the gas is derived from a suitable source, such as a cylinder or tank (not shown) where it may be kept under relatively high, i. e. super-atmospheric pressure. The water pipe 12 includes an aspirator or injector 14 which has a narrow throat 16 further reduced by a central plug 17 and also has a passage 18 leading to the throat, all so arranged that the flow of water through the pipe 12 and the aspirator throat creates a considerable suction or vacuum in the passage 18. Through the pressure controlling means hereinbelow described, the vacuum or negative pressure developed at the aspirator is used to draw gas from the line 10 at the desired rate of flow and to effect its injection into and mixture with the water stream in the pipe 12. The stream in the latter may represent a so-called minor flow into which a relatively large concentration of chlorine is introduced, the pipe 12 then extending, i. e., beyond and above the aspirator 14, to the water main, sewer conduit or other vessel (not shown) into which chlorine is thereby introduced for use, for example in the case of drinking water, in the usual low concentration of not more than a few parts per million.

The extent of suction or negative pressure developed by the injector 14 may be regulated by a hand wheel 20 which through a threaded connection 22 serves to move a shaft 23 carrying the plug 17, i. e. to adjust the latter in a vertical direction for altering the suction effect in or from the throat 16. It will be understood that adjustment of the hand wheel 20 is usually only necessary when the apparatus is first put into operation, the negative pressure developed at the aspirator being set at a higher value, i. e., a greater vacuum, than any controlled value which is to be employed up-stream of the aspirator, e. g., even at maximum gas flow.

The conduit system or structure through which the gas passes from the inlet pipe 10 to the injector passage 18 includes: a vertical tube 25 terminating in a pressure regulating or reducing valve generally designated 26 and contained in a chamber 28 enclosed by a bell jar 29; a calibrated orifice 30, which is the so-called metering orifice or resistance, and through which gas passes from the chamber into a conduit 32; a throttling valve 34, a further pipe 35 and a ball check valve 36 from which the gas enters the passage 18. The valve 26 serves to reduce the pressure of the gas from its high positive value at the source to a suitable state, conveniently a small negative value (under the suction of the aspirator) which is kept constant, i. e., in the chamber 28. The orifice 30 effects a drop in the pressure of the gas traversing it, the lower pressure (i. e., greater vacuum) on the downstream side being controlled by the throttling valve 34 which is thus adjusted, by a further means explained below, to set the gas flow at a desired value, or to change it as the operator may wish. In other words, the feed of gas to the injector is adjusted by changing the pressure drop across the orifice 30, and can be measured by the amount of such drop.

The bell jar 29 has its bottom edge sealed by a clamp 40 in a conforming recess around the top of a tray-like vessel designated 42, which in turn communicates freely through a relatively large passage 44 with a like vessel 45 having its open top enclosed by a bell 46 similarly sealed in place by a clamp 48. The assemby 46, 45 thus provides an auxiliary chamber 50 which has its upper portion kept at atmospheric pressure as explained below. For ready observation of the operation of various parts, the bell jar 29, the bell 46 and numerous other elements of the apparatus may be constructed of glass or other transparent material suitably inert to chlorine.

From a tube 51 rising into the space under the bell 46, water constantly overflows into the lower part of the chamber 50. A relatively wide overflow tube 54 extends down through the floor of the vessel 45 and opens near the bottom of a closed waste chamber 56, specifically below the level of a drain pipe 57 through which water may be continuously drained away to a disposal locality, at least outside of the room in which the apparatus is located. At its upper end the drain tube 54 extends vertically within the chamber 50 and has in its side wall a plurality of slots or holes 58 through which water continuously overflows as further water is introduced from the pipe 51. Within the waste chamber 56 but above its water level 60, the waste tube 54 has a side opening 61 so that the space within the tube communicates with the space in the chamber 56 and also with an outlet passage 62 that may extend from the top of the chamber 56 through further pipe or hose (not shown) to the outside air, preferably at a place outside the building. By the above arrangement, the chamber 50 is maintained at atmospheric pressure, but without gaseous communication between it and the immediate vicinity of the apparatus. At the same time the overflow openings 58 keep the water at a constant level in the chamber 50, while the overflowing water, which is far less than sufficient to fill the tube 54, drains into the chamber 56 and out through its discharge passage 57. Thus even though chlorine gas may become dissolved in water such water is not exposed and there is no opportunity for chlorine to diffuse from it into the air of the room. Continuous supply of water to the pipe 51 is maintained through a feed pipe 65 and an inlet pipe 66 having a shut-off and regulating valve 67 and extending to a water main or other source, not shown.

As indicated above, the pressure in the bell jar chamber 28 is maintained at a slight negative or sub-atmospheric value, which may be selected at any desired amount, for instance equal to a head of a few inches of water, one useful example of such value being two inches. In consequence the water under the bell jar stands at a level which is higher than the atmospheric level by the selected value, e. g. a vacuum of a few inches or so, here represented by the distance D.

The pressure regulating valve 26 and its operating means is described in my aforesaid co-pending application Serial Number 74,036.

In order to vary the rate of gas flow through the conduit system leading to the injector 14, the valve 34 throttles the excess of suction created by the injector to the precise amount desired on the down-stream side of the metering orifice 30. The valve 34 comprises a valve member or stem 140 cooperating with a valve seat 141 and actuated by a rod 142 driven by a device 144. For control of the valve adjusting device 144 there is provided a chamber 150 which communicates with the conduit 32, and thus with the down-stream side of the orifice 30, through a passage 151. The chamber 150 contains a body of water 152, maintained at a constant level 153 by an over-flow pipe 154, extending through a further pipe 155 to the waste chamber 56 where it opens beneath the level of the water, as shown, so that there can be no back flow of air. Water is continuously supplied to the chamber 150 by flow from a tube 157 connected to an appropriate main or other source (not shown) through a shut-off valve 158. An inverted cup or bell-shaped device 160 is disposed within the chamber 150, being buoyed partly above the surface of the water by the volume of air contained underneath the bell, i. e. inside it at 161 and above the level 162 to which the water of the body 152 rises therein. A tubular passage 164 extends up through the bottom of the chamber 150 and opens at its top in the air space 161 underneath the bell, thus communicating with such air space.

The bell 160 is attached, e. g. at a midpoint of its upper surface, to one end of a lever 166 which is pivoted on a horizontal axis at 167 to the wall of the chamber 150, the pivot shaft and corresponding opening in the wall being sealed by a flexible diaphragm 168. The outer end of the lever 166 is connected by a long vertical link 169 to the outer end of a lever 170 which is pivoted at 171 to the yoke 172 of the valve actuating device 144. The nature of the control device is similar to that of corresponding pneumatic control devices described in my said co-pending application Serial No. 74,036. It includes a sealing diaphragm 174 for the entry of the valve operating rod 142 into the vacuum space of conduit 32, a return spring 175 normally under compression, and a diaphragm 176 enclosing the driving chamber 178 and carrying valve passage 179 with which the needle valve element 180 cooperates, being carried at the opposite end of the lever 170 to the link 169. A spring 182 is disposed under tension between a point on the lever 170 (intermediate its fulcrum and the connection of the link 169) and an arm 183 extending from the yoke 172, the tension of the spring 182 being adjusted by the nut 184.

The device 144 operates in that upon any tendency of the link 169 to close the valve 180, compressed air supplied to the chamber 178, e. g. through a tube 186 including an orifice or resistance 187, then effects displacement of the diaphragm 176 and with it the valve element 140, until the result of the adjustment restores the link 169, so to speak, to a condition of stability (as further explained below), bringing the parts to rest in a new and rebalanced condition. Upon motion of the link 169 in the opposite direction, i. e. tending to open the valve 180, reverse operation of the device occurs under the force of the spring 175, effecting like downward adjustment of the valve element 140.

It will also now be seen that the described control operation of the link 169 is in turn controlled by the pressure conditions inside and outside of the bell 160, which acts as if it were a frictionless piston having different values of vacuum or negative pressure on its opposite sides. More specifically, if it is assumed that a predetermined vacuum has been maintained in the space 161 under the bell and that the force of various parts is such that the bell remains at rest with a corresponding, somewhat higher vacuum in the outer space of the chamber 150 and thus in the passage 32, a change in the pressure under the bell will produce a controlling motion of or force on the link 169. For example, if the vacuum increases in the space 161 (i. e. the absolute pressure falls), the bell 160 tends to be sucked down, pulling upwardly on the link 169 and tending to close the valve element 180. As a result and in the manner described above, the throttling valve element 140 is adjusted upwardly, opening the throttle valve 34 to a further extent and permitting an increase of vacuum in the conduit 32, viz. a greater amount of suction as derived from the aspirator device 14. In consequence the negative pressure in the line 32 increases in proportion, and in fact in equal amount, to the controlling increase of pressure under the bell 161, and by the communication of the higher vacuum in the line 32 to the space in the chamber 150 outside the bell, the parts are re-balanced at a new state of rest. The newly established pressure in the line 32 has thus been determined by the controlling vacuum in the space 161. A similar but reverse operation occurs, as will now be appreciated, when the vacuum under the bell 160 is decreased; the valve 34 is adjusted to a more closed position, reducing the suction transmitted from the aspirator and correspondingly reducing the vacuum in the conduit 32, on the down-stream side of the orifice 30.

The difference of water levels 153, 162, i. e. the constant difference in pressure or vacuum maintained between the interior and exterior of the bell 160 in the chamber 150, is determined by the equivalent weight of the bell and of its linkage to the diaphragm power unit 144, together with the force of the damping spring 182. Thus the downward force of the influences just mentioned tends to sink the bell 160, and the vacuum above the bell in the chamber 150 must be sufficiently greater to overcome such downward force at the desired difference of water level. Most conveniently the downward force may be adjusted, e. g. by adjusting the nut 184 and changing the tension of the spring 182, so that the constant difference in pressure between the inside and outside of the bell is exactly equal to D, viz. the amount by which the vacuum under the bell jar 28 departs from atmospheric pressure.

As further explained below, this arrangement of the parts including the regulating bell 160 such that the pressure difference across the latter is exactly equal to the vacuum under the bell jar 29 has a number of special advantages. At least in part, these are related to convenience in use and measurement of such controlling vacuum as may be employed for communication to the interior of the bell 160 through the tube 164. At zero gas flow in the line 32 and through the orifice 30, the pressure on both sides of the latter should be the same, i. e. the small vacuum which is maintained under the bell jar. In consequence for such zero flow, where the pressure in the chamber 150 outside the bell 160 is equal to the stated small vacuum, viz. D, the pressure under the bell 160 will then be atmospheric. In other words, the controlling vacuum supplied to the tube 164 may conveniently vary from zero, i. e. atmospheric pressure, for a state of zero gas flow, upward through a range of values directly representative of the amounts of gas flow to which adjustment may be made.

Although any of a variety of means may be employed to furnish the desired, controllable vacuum for supply to the tube 164 and consequent control of the valve 34, and although such other means may include remotely or automatically controlled devices, to change, interrupt or initiate operation of the chlorine supply in accordance with a preset program or the like, the drawings illustrate one simple and effective instrumentality. To such end, there is provided an air aspirator 200 which is supplied with air under pressure from the tube 201 connected to the compressed air supply system, e. g. the tube 134, and which produces a vacuum or suction in the successive tubes 202, 203 leading to the tube 164. An adjustable pressure relief or regulating device 205 is connected to communicate with the passage 202—203 by a tube 206 and constitutes means adjustable, e. g. by the knob 207, for varying the vacuum in the line 202—203, thereby supplied to the interior of the bell 160.

The regulating or relief valve 205 includes a chamber 222 closed by a flexible diaphragm 223 which is loaded by a coil spring 224 under tension between the center of the diaphragm and a traveling nut or sleeve 225. The axial opening of the nut 225 is threaded on a shaft 226 which carries the knob 207, the nut 225 having a lateral pin 228 riding in a longitudinal slot 229, so that as the knob is turned, the nut 225 is displaced axially without rotation and thus changes the tension of the spring 224. The diaphragm 223, conveniently from its side facing the chamber 222, is connected to a valve disc or element 230 which is outwardly disposed relative to a seat or opening 231 in the wall of the chamber. Thus as the diaphragm 223 moves to the left for expansion of the chamber 222, the valve disc 230 is brought against the seat 231, while reverse displacement of the diaphragm tends to open the valve and bleed air into the chamber 222 to an extent determined by the position of the valve disc relative to the opening.

It will now be seen that for any setting of the knob 207 and thus for any selected tension of the spring 224 a predetermined vacuum will be established in the line 202—203, such vacuum being determined by the extent to which it is relieved through the opening 231, the effective size of the latter being dependent on the state of balance between the force of spring 224 and the suction on the diaphragm. The vacuum is thus adjustable by the knob 207, in that increase of tension on the spring requires a greater vacuum in the chamber 222 in order to open the valve and bleed off the excess, i. e. the difference between the regulated vacuum and the maximum, so to speak, of which the aspirator 200 is capable. Likewise, reducing tension on the spring 224 requires the vacuum in the chamber and the lines 202, 203 to build up only to a correspondingly lower value, when the bleeding-off point is reached at the valve 230—231. Conveniently, the capacity of the aspirator 200 is such that the air flow through and out of the regulating valve 205 is small relative to the size of the passages (e. g. passages 202 and 203) whereby the control vacuum thus established beneath the bell 160 is substantially the same as that provided in the regulating valve device 205.

Although other appropriate indicating means may be employed for the regulating valve 205, and calibrated in terms of chlorine flow through the conduit system 25—28—32—35, the drawings illustrate a particularly suitable arrangement, diagrammatically shown as including an arm 240 extending from a rack 241 geared to a pinion 242 on the shaft 226 of the regulating device. The arm 240 conveniently carries a double pointer 244 cooperating with certain manometer structure now to be described.

The flow indicating means shown in the drawings comprises three manometers 250, 251 and 252, advantageously constituted by vertical, transparent tubes extending at their lower ends to appropriate passages in a supporting block 254 and arranged in a closely-spaced, parallel array. The block 254 also carries a closed water chamber 256 into which there projects (from the bottom) an overflow tube 257 that extends into the upper part of the waste chamber 56, the tube 257 thus serving to maintain a predetermined level 258 of water in the chamber 256. The lower ends of the manometer tubes 250, 251 respectively communicate with the bottom of the chamber 256 through passages 260, 261, so that the chamber constitutes, in effect, the other leg of each of the corresponding manometers. The vertical tube 252 opens, at its lower end, in a passage 262, the latter extending to an upright tube 263 in the chamber 256 having its open end spaced above the water level 258 by a suitable distance, most advantageously equal to the distance D and thus corresponding to the small, predetermined vacuum which is constantly maintained under the bell jar 29. Through a pipe 265 connected with the water supply line 66 and projecting down into the upper open end of the tube 263 water is continuously supplied to the manometer constituted by legs 252, 263 and thus continuously overflows the tube 263 into the vessel 256 to keep the latter filled to its intended level 258 (and likewise to supply the other manometers), the excess running off through the drain pipe 257 to waste via the chamber 56.

Since the interior of the chamber 256 communicates with the atmosphere through the pipe 257, the waste chamber 56 and its atmosphere connection 62, the pressure in the chamber 256 is atmospheric, and the levels to which water rises in the connected manometers 250 and 251 thus represent the extent of vacuum or negative pressure in the devices to which these manometers are respectively connected, such vacuum being measured by the height of water column in each of the tubes 250, 251 above the level 258 of water in the chamber 256. Since the level of water in the right-hand leg 263 of the manometer constituted by tube 252 is maintained at the top of the tube 263 (at atmospheric pressure) and thus higher than the level 256 by the distance D, the water in the manometer tube 252 will, if the latter is connected to a source of vacuum, rise to a point higher than the top of tube 263 by a distance measuring the last-mentioned vacuum.

The manometer 250 at its upper end communicates with the interior of the bell jar chamber 28 through a vertical tube 270, while the manometer 251 communicates through a tube 271 with the interior of the conduit portion 32, i. e. the down-stream side of the metering orifice 30, and the third or right-hand manometer 252 at its upper end communicates through a like static tube 272 with the line 203—164, containing the control vacuum applied to the interior of the valve-adjusting bell 160. Thus the manometers 250, 251 and 252, conveniently arranged in the order named, provide water levels which indicate the vacuum respectively on the up-stream side of the orifice 30, on the down-stream side of the latter and in the control line for the device which adjusts the last-mentioned vacuum.

Bearing in mind that the control vacuum measured in the manometer 252 is less than the controlled vacuum in the passage 32 by an amount exactly equal to D, and further noting that by reason of the structure of the other leg 263 of manometer 252 within the chamber 256 the zero vacuum level of water in the manometer 252 is raised above that of the tubes 250 and 251 by the same amount D, it will be seen that when the apparatus is functioning in the described and intended manner, the water levels in both tubes 251 and 252 should be the same and should represent, by difference from the level in the tube 250, the amount of gas flow in the system under control. Thus the double pointer 244 may be arranged to sweep vertically along both manometers 251, 252, in cooperation with a scale 274 which can be graduated, if desired, in units of chlorine flow (e. g. pounds of chlorine per hour, or the like) ranging from a zero value at the normal, maintained level equal to D in the manometer tube 250.

By this arrangement of manometers, a full and continuous check is afforded of the status of vacuum or negative pressure at various significant localities of the apparatus, i. e. on both sides of the metering orifice and in the control device for adjustment of the gas flow. As stated, the vacuum under the bell jar, up-stream of the orifice 30, is kept very exactly constant in normal operation. The difference of pressure across the orifice is thus simply read as the level of water in the tube 251, i. e. above the constant level or zero reference point afforded by the water in tube 250 and the corresponding zero marking of the scale 274. As already explained, the vacuum provided in the control line 164 and read on the manometer 252 should keep the liquid in the latter at exactly the same level as that reached in the manometer 251.

Thus to change the flow of chlorine gas through the apparatus, all that is necessary is to turn the knob 207, thereby moving the arm 240 and the pointer 244. The levels of water in both manometers 251 and 252 should follow the pointer 244 quite exactly, the level in the manometer 251 serving as actual indication of the condition of gas flow, and the level in the manometer 252, as well as the position of the pointer 244, serving to indicate that the control devices are functioning in the proper and intended manner, i. e. so long as these last-mentioned indications substantially correspond with that of the manometer 251. A convenient and easily read indication is thereby afforded, both of the actual flow of gas at all times and of the desired functioning of various parts of the equipment.

In the control of the valve 34, and thus in the actual adjustment of rate of gas feed, the arrangement of the bell 160 utilizing a flow control vacuum is peculiarly advantageous. Being a static vacuum, so to speak, it may be controlled by relatively simply means remote from the apparatus, yet suffer no disadvantages of friction loss, inertia loss or the like in the transmitting or controlled elements. Because the device is operable, by adjustment as shown, to utilize a vacuum (under the bell 160) ranging upwards from zero at zero flow, its control is facilitated, atmospheric pressure being the most convenient datum upon which to base pressures or partial pressures of the magnitude here contemplated. It may be noted that the difference of water levels 153 and 162 can be adjusted by means of the nut 184, i. e. varying the tension of the spring 182 on the lever 170 of the pneumatic valve-actuating device; as above indicated, it is at present preferred that this adjustment be so made that the difference is equal to D, the constant vacuum under the bell jar 29. As also previously explained, the value of this vacuum D in the bell jar chamber is determined and kept constant at the desired, preliminarily adjusted value by the instrumentalities under control of the ball float 80, which are described in my said application Serial No. 74,036 and need not be described here.

It will be appreciated that the regulating action of the valve 34 as controlled by the chambers 150 and 161 extends also to the maintenance of the desired pressure in the conduit locality 32, against changes in condition (such as a rise or fall in the suction produced by the injector 14) tending to modify such pressure. Thus any departure of the pressure in chamber 150 from the value which was selected under control of the vacuum adjusting device 205 unbalances the bell 160 and causes the pneumatic device 144 to adjust the valve 34 until the predetermined relationship of pressures in the chambers (viz. the pressure difference D) is re-established, i. e. by restoring the negative pressure in the conduit 32 and chamber 150 to the selected value.

It is to be understood that the invention is not limited to the specific apparatus herein shown and described but may be embodied in other forms without departure from its spirit.

I claim:

In apparatus for advancing gas along a conduit under the negative pressure of suction applied at an end of the conduit, in combination, an adjustable valve in the conduit for varying the negative pressure therein at a locality upstream of the valve, a liquid-containing chamber having a space above the liquid open to the conduit at said locality, a movable but normally balanced chamber disposed in said first chamber and enclosing a space sealed by said liquid, means including a gas-pressure-communicating passage opening into the said space of the movable chamber, for adjusting the gaseous pressure therein, said chambers being arranged so that the difference of liquid levels between the chambers corresponds, when the movable chamber is at rest, to the difference of gaseous pressures in the chambers, means controlled by the movable chamber and responsive to unbalance thereof, for adjusting the valve to modify the pressure at the aforesaid locality until balance of the chambers is restored, said movable chamber and its said valve-adjusting means comprising means for producing balance of the movable chamber whenever the negative pressure in the outer chamber is more negative than that within the movable chamber by a predetermined amount, said apparatus also including a plurality of liquid-containing manometers respectively connected to indicate the pressure in the conduit at said locality and the pressure in the movable chamber, said manometers being disposed in parallel relation and adapted to indicate the respectively detected pressures on vertical scales ranging from fixed points of zero negative pressure, and liquid level regulating means for the manometer connected to the interior of the movable chamber, to adjust the liquid level of said last-mentioned manometer so that its said point of zero negative pressure stands at a level above that of the first manometer by an amount equal to the normally maintained difference in water levels between the chambers.

References Cited in the file of this patent

UNITED STATES PATENTS

| | | |
|---|---|---|
| 841,618 | Bruyn | Jan. 15, 1907 |
| 1,174,124 | Connet | Mar. 7, 1916 |
| 1,488,947 | Smith | Apr. 1, 1924 |
| 2,427,235 | Smoot | Sept. 9, 1937 |
| 2,529,875 | Howard | Nov. 14, 1950 |